US010998557B2

(12) United States Patent
Kim et al.

(10) Patent No.: US 10,998,557 B2
(45) Date of Patent: May 4, 2021

(54) SEPARATOR FOR FUEL CELL, MANUFACTURING METHOD THEREOF, AND FUEL CELL HAVING SUCH A SEPARATOR

(71) Applicant: Doosan Corporation, Seoul (KR)

(72) Inventors: Ho-Suk Kim, Seoul (KR); Byung-Sun Hong, Seongnam (KR); Mee-Nam Shinn, Yongin (KR)

(73) Assignee: Doosan Corporation, Seoul (KR)

( * ) Notice: Subject to any disclaimer, the term of this patent is extended or adjusted under 35 U.S.C. 154(b) by 199 days.

(21) Appl. No.: 16/139,429

(22) Filed: Sep. 24, 2018

(65) Prior Publication Data

US 2019/0027763 A1    Jan. 24, 2019

Related U.S. Application Data

(60) Continuation of application No. 14/487,212, filed on Sep. 16, 2014, now Pat. No. 10,109,865, which is a
(Continued)

(30) Foreign Application Priority Data

Mar. 10, 2004   (KR) .......................... 10-2004-0016162

(51) Int. Cl.
*H01M 8/0213*   (2016.01)
*H01M 8/0271*   (2016.01)
(Continued)

(52) U.S. Cl.
CPC ......... *H01M 8/0213* (2013.01); *H01M 2/145* (2013.01); *H01M 8/021* (2013.01);
(Continued)

(58) Field of Classification Search
CPC .. H01M 8/0213; H01M 8/0271; H01M 8/026; H01M 2/145; H01M 8/0223; H01M 8/0228

See application file for complete search history.

(56) References Cited

U.S. PATENT DOCUMENTS 4,988,583 A * 1/1991 Watkins .............. H01M 8/0228
429/492
5,527,363 A    6/1996 Wilkinson et al.
(Continued)

FOREIGN PATENT DOCUMENTS

EP    1098380    5/2001
EP    1253657    10/2002
(Continued)

OTHER PUBLICATIONS

Machine translation of KR2003-0060668 (Year: 2020).*
(Continued)

*Primary Examiner* — Maria Laios
(74) *Attorney, Agent, or Firm* — Sheridan Ross P.C.

(57) ABSTRACT

A lamellar structure graphite foil is used as a material for a separator for a fuel cell, and a hydrophobic layer is formed by impregnation on flow-field channels of the graphite foil. Such a separator is manufactured by forming the flow field channel by etching the graphite foil formed with the mask pattern thereon and forming a hydrophobic layer by impregnation. According to such a separator, performance of a fuel cell stack is enhanced and the manufacturing process of a separator is simplified.

14 Claims, 11 Drawing Sheets

Related U.S. Application Data division of application No. 10/598,729, filed as application No. PCT/KR2004/001950 on Aug. 3, 2004, now Pat. No. 8,865,372.

(51) Int. Cl.

| | | |
|---|---|---|
| *H01M 8/026* | (2016.01) | |
| *H01M 8/021* | (2016.01) | |
| *H01M 8/0228* | (2016.01) | |
| *H01M 8/0223* | (2016.01) | |
| *H01M 8/0263* | (2016.01) | |
| *H01M 8/0273* | (2016.01) | |
| *H01M 2/14* | (2006.01) | |
| *H01M 8/0286* | (2016.01) | |
| *H01M 8/1011* | (2016.01) | |

(52) U.S. Cl.
CPC ......... *H01M 8/026* (2013.01); *H01M 8/0223* (2013.01); *H01M 8/0228* (2013.01); *H01M 8/0263* (2013.01); *H01M 8/0271* (2013.01); *H01M 8/0273* (2013.01); *H01M 8/0286* (2013.01); *H01M 8/1011* (2013.01); *Y02E 60/50* (2013.01); *Y02P 70/50* (2015.11)

(56) References Cited

U.S. PATENT DOCUMENTS

| | | | |
|---|---|---|---|
| 6,291,094 B1 | 9/2001 | Yoshimura et al. | |
| 6,706,437 B2 | 3/2004 | Trapp et al. | |
| 8,865,372 B2 | 10/2014 | Kim et al. | |
| 2005/0100771 A1* | 5/2005 | Vyas .................. | H01M 8/0206 429/437 |
| 2015/0004516 A1 | 1/2015 | Kim | |

FOREIGN PATENT DOCUMENTS

| | | | |
|---|---|---|---|
| JP | 59-146168 | | 8/1984 |
| JP | 61-253769 | | 11/1986 |
| JP | 10-125337 | | 5/1998 |
| JP | 10-255823 | | 9/1998 |
| JP | 2000-036309 | | 2/2000 |
| JP | 2000-082475 | | 3/2000 |
| JP | 2000-106199 | | 4/2000 |
| JP | 2000-138067 | | 5/2000 |
| JP | 2000-231925 | | 8/2000 |
| JP | 2000-277133 | | 10/2000 |
| JP | 2001-076740 | | 3/2001 |
| JP | 2001-076748 | | 3/2001 |
| JP | 2001-118587 | | 4/2001 |
| JP | 2001-283880 | | 10/2001 |
| JP | 2002-042828 | | 2/2002 |
| JP | 2002-216786 | | 8/2002 |
| JP | 2003-217611 | | 7/2003 |
| KR | 2003-0060668 | | 7/2003 |
| KR | 20030060668 | * | 7/2003 |
| WO | WO 02/05367 | | 1/2002 |
| WO | WO 02/065565 | | 8/2002 |

OTHER PUBLICATIONS

Bob Utech: "A Guide to High-Performance Powder Coating", Society of manufacturing Engineers, May 2002(May 2002), pp. 65-67, ISBN:0872635473.
Written Opinion for International (PCT) Application No. PCT/KR2004/001950, dated Nov. 26, 2004, 3 pages.
International Search Report for PCT Application No. PCT/KR2004/001950, dated Nov. 26, 2004, 1 page.
Supplementary European Search Report for International Application No. PCT/KR2004/001950, dated Jun. 29, 2009, 3 pages.
Official Action for U.S. Appl. No. 10/598,729, dated Feb. 25, 2010, 5 pages.
Official Action for U.S. Appl. No. 10/598,729, dated Jun. 23, 2010, 8 pages.
Official Action for U.S. Appl. No. 10/598,729, dated Dec. 7, 2010, 8 pages.
Official Action for U.S. Appl. No. 10/598,729, dated Dec. 2, 2013, 9 pages.
Notice of Allowance for U.S. Appl. No. 10/598,729, dated Jun. 24, 2014, 8 pages.
Official Action for U.S. Appl. No. 14/487,212, dated Aug. 10, 2017 6 pages Restriction Requirement.
Official Action for U.S. Appl. No. 14/487,212, dated Jan. 29, 2018 8 pages.
Notice of Allowance for U.S. Appl. No. 14/487,212, dated Jun. 25, 2018 7 pages.

* cited by examiner

US 10,998,557 B2

SEPARATOR FOR FUEL CELL, MANUFACTURING METHOD THEREOF, AND FUEL CELL HAVING SUCH A SEPARATOR

CROSS-REFERENCE TO RELATED APPLICATION

This application is a continuation application of U.S. Ser. No. 14/487,212, filed on Sep. 16, 2014, which is a divisional application of U.S. Ser. No. 10/598,729 entitled "Separator for Fuel Cell, Manufacturing Method Thereof, and Fuel Cell Having Such a Separator" filed on Sep. 8, 2006 and issued as U.S. Pat. No. 8,865,372 on Oct. 21, 2014, which is a National Stage Application under 35 U.S.C. § 371 of PCT Application No. PCT/KR2004/001950 having an International Filing Date of Aug. 3, 2004, which designated the United States, which PCT Application claimed the benefit of Korean Patent Application No. 10-2004-0016162, filed on Mar. 10, 2004, the entire disclosures of which are hereby incorporated herein by reference.

BACKGROUND OF THE INVENTION

(a) Field of the Invention

Generally, the present invention relates to a fuel cell. More particularly, the present invention relates to a separator for a fuel cell using a graphite foil, a manufacturing method thereof, and a fuel cell stack including such a separator.

(b) Description of the Related Art

As is well known in the art, a fuel cell produces electric power by an oxidation reaction at an anode and a reduction reaction at a cathode. The anode and the cathode are formed with a catalyst layer having platinum or platinum-ruthenium metal for accelerating the oxidation and reduction reactions.

At the anode, fuel gas (for example, hydrogen) is supplied thereto and is divided into ions (for example, protons) and electrons through the oxidation reaction. At the cathode, the divided ion bonds with a reduction gas (for example, oxygen) to form water. Final products of such reactions are electricity (i.e., electron movement from the anode to the cathode), water (i.e., a chemical bond of hydrogen and oxygen), and heat. A fuel cell stack is usually provided with a cooling device for removing such heat.

The water formed at the cathode is usually formed as vapor or liquid, and such water is removed by a strong stream of reduction gas (oxygen or air) flowing at a cathode side.

FIG. 1 is a schematic sectional view of an exemplary fuel cell stack according to the prior art.

Usually, a fuel cell stack is formed by stacking a plurality of unit cells 100.

Such a unit cell 100 includes a proton exchange membrane 110 (for example, a polymer electrolyte membrane). An anode 121 and a cathode 122 are formed at both sides of the proton exchange membrane 110. The proton exchange membrane 110 and electrodes 121 and 122 form a membrane electrode assembly (MEA) 130 by hot pressing. Fluid diffusion layers 125 are formed to the exterior of the electrodes 121 and 122 of the MEA 130.

MEAs 130 of adjacent unit cells are separated and supported by a separator 150. The separator 150 is formed with a flow field 151 for supplying fuel gas (e.g., hydrogen, or methanol in the case of a direct methanol fuel cell) to the anode. In addition, the separator 150 is also formed with a flow field 152 for supplying oxygen or air as a reduction gas to the cathode, and also for exhausting water. A gasket 160 is applied between the separator 150 and the MEA 130, for preventing leakage of gas/liquid flowing through the flow fields 151 and 152.

The unit cells 100 including the MEA 130, the separator 150, and the gasket 160 are stacked in series to form a high voltage. The stacked unit cells are conjoined by, e.g., current collectors and end plates 170 disposed at ends thereof.

As can be understood from the above description, a separator in a fuel cell distributes reaction gases (i.e., fuel gas and reduction gas) through the fuel cell stack, separates a fuel gas (e.g., hydrogen or methanol) and a reduction gas (e.g., oxygen or air), and electrically connects adjacent unit cells by providing an electron passage between an anode and a cathode of adjacent unit cells. In addition, the separator has a heat exhaust structure for exhausting heat produced by the oxidation-reduction reaction of the fuel cell stack, and provides mechanical strength for supporting the stacked unit cells.

In order to accelerate movement of hydrogen ions (i.e., protons) produced at the anode to the cathode through a polymer electrolyte membrane, the polymer electrolyte membrane should be hydrated to contain an appropriate amount of moisture. The hydrated polymer electrolyte membrane prevents movement of electrons therethrough while allowing movement of hydrogen ions.

When the polymer electrolyte membrane is not sufficiently hydrated, ion conductivity of the polymer electrolyte membrane is lowered, and therefore performance of a fuel cell is deteriorated. To the contrary, when the polymer electrolyte membrane is excessively hydrated, small pores forming a triple-phase boundary of reaction are blocked (which is usually called flooding), and thereby the reaction area of the electrodes reduces, resulting in deterioration in performance of the fuel cell.

Therefore, in the case that the water formed at cathodes is not promptly exhausted, reaction gas is not sufficiently supplied to the catalyst layer, and therefore performance of a fuel cell is deteriorated.

Many separators, including an exemplary one disclosed by U.S. Pat. No. 4,988,583, have serpentine flow fields for fuel and reduction gases. This is mainly for utilizing a pressure drop along the flow fields for efficient exhaust of water formed at the cathodes.

The water formed at the cathodes is in the form of vapor, near the entry of reduction gas flow-field channel. However, as it flows through the reduction gas flow-field channel, it becomes of two phased, as mixed liquid and vapor. In this case, liquefied water drops fill the pores of the cathodes, and accordingly, the effective active areas of the catalyst layers become reduced. In addition, liquefied water requires a high pressure of reduction gas for exhaust thereof.

Therefore, energy loss occurs by a pressure drop of reduction gas between entry and exit of flow fields, and reaction gas is much consumed for stable realization of the reduction reaction at a high flow speed. Therefore, if water exhaust of a separator having serpentine flow fields becomes more stable and efficient, it will promise a reduction of energy loss by the pressure drop of reduction gas between the entry and exit of the flow fields and reduction of consumption of reaction gas.

Graphite or carbon composite materials are widely used for a separator for a polymer electrolyte membrane fuel cell. The graphite and the carbon composite material show strong anti-corrosiveness to the oxidation-reduction reaction of a fuel cell, and also have a merit of low bulk density in comparison with metallic materials (e.g., stainless steel).

When the graphite or the carbon composite material is used as a material for a separator, according to the prior art, a resin such as thermosetting or thermoplastic resin is usually added to the separator material in order to prevent movement of hydrogen by filling micropores of the separator, and also for easy forming during the molding process. However, the resin included in the separator causes an increase of volume resistance with respect to movement of electrons, and thereby deteriorates performance of a fuel cell. Furthermore, the resin increases contact resistance between cells.

As an exemplary method for reducing an increase of contact resistance between cells cause by the resin in the separator, European Patent Publication No. EP1253657A1 discloses a method in which rib surfaces of flow fields of a separator are etched in an alkaline solution such that the resin in the surface area of the rib may be removed.

According to the prior art, the manufacturing process for a stable and useful separator using a graphite or a carbon composite material has been very complex, non-productive, and non-efficient. Therefore, if a separator using graphite or a carbon composite material can result in higher performance and be appropriate for mass production, it promises a substantial decrease in production cost of a separator and in turn production cost of a fuel cell, as well as enhancement of performance of a separator.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Therefore, the present invention has been made in an effort to solve the above-described problem. The motivation for the present invention is to provide a separator for a fuel cell, a manufacturing method thereof, and a fuel cell including such a separator, providing an enhanced water exhaust performance, enhanced durability, and being more appropriate for mass production.

From such motivation, a separator for a fuel cell according to the present invention is a separator for a fuel cell that is capable of closely contacting either an anode or a cathode of an MEA (membrane electrode assembly) of a fuel cell and interposing a fluid diffusion layer, the separator having a flow field channel for allowing a fluid to flow between the separator and the fluid diffusion layer, characterized in that: the separator comprises a lamellar structure graphite foil; and a hydrophobic layer is formed by impregnation on an interior side of the flow field channel.

The lamellar structure graphite foil may include a stainless steel layer therewithin. Preferably in this case, the stainless steel layer is exteriorly exposed, interposing the hydrophobic layer.

Preferably, the graphite foil is substantially free from thermosetting or thermoplastic resin.

A bulk density of the graphite foil preferably lies in the range of 1.5 g/cm$^3$ to 2.0 g/cm$^3$.

A thickness of the graphite foil preferably lies in the range of 0.5 mm to 3 mm.

A thickness of the hydrophobic layer preferably lies in the range of 30 μm to 100 μm.

It is preferable that at least one manifold is formed in the separator, and a sealing member is unified to the separator along each circumference of the at least one manifold and an area for contacting the fluid diffusion layer.

It is preferable that the sealing member encloses, respectively along a closed curve, each of the at least one manifold and the area for contacting the fluid diffusion layer.

In addition, a method for manufacturing a separator according to the present invention is a method for manufacturing a separator for a fuel cell that is capable of closely contacting either an anode or a cathode of an MEA of a fuel cell and interposing a fluid diffusion layer, and has a flow field channel for allowing a fluid to flow between the separator and the fluid diffusion layer, characterized in that the method includes:

preparing a graphite foil of a predetermined size;

forming a mask pattern on the graphite foil corresponding to the flow field channel;

forming the flow field channel on the graphite foil by etching the graphite foil formed with the mask pattern thereon;

forming a hydrophobic layer on an interior side of the flow field channel by impregnation; and removing the mask pattern from the graphite foil.

It is preferable that the forming of a mask pattern on the graphite foil includes:

coating the graphite foil with a dry film resist;

exposing the coated graphite foil; and developing the dry film resist on the graphite foil by moving a spray nozzle of a spray-type developing apparatus thereover.

As another example, it is also preferable that the forming of a mask pattern on the graphite foil includes attaching a mask on the graphite foil, the mask being provided with a pattern corresponding to the flow field channel and being made of rubber or stainless steel.

It is preferable that the forming of the flow field channel on the graphite foil includes at least one of sandblasting and ultrasonic etching.

It is preferable that the forming of a hydrophobic layer on the interior side of the flow field channel by impregnation includes:

forming a hydrophobic layer on the graphite foil attached with the mask pattern and formed with the flow field channel; and drying the graphite foil formed with the hydrophobic layer, in a temperature range of 50° C.-90° C.

It is preferable that, in the forming of a hydrophobic layer on the graphite foil, a hydrophobic solution is spray coated on a surface of the graphite foil, or the graphite foil is dipped in the hydrophobic solution.

As for a bipolar separator in which the flow field channel is formed on each of front and rear sides thereof, it is preferable that:

the mask pattern includes a front mask pattern and a rear mask pattern;

at least one pair of aligning holes are formed at each of the front and rear mask patterns;

at least one aligning hole is formed through the graphite foil corresponding to the aligning holes of the mask patterns; and the aligning holes of the mask patterns and the aligning holes of the graphite foil are aligned by using at least one pair of aligning bars corresponding thereto.

It is preferable that the at least one pair of aligning holes and the at least one pair of aligning bars respectively include a plurality of pairs thereof, corresponding to different sizes.

A fuel cell stack according to the present invention is a fuel cell stack including at least one unit cell, wherein the at least one unit cell includes:

an MEA including a polymer electrolyte membrane, and an anode and a cathode formed on both sides thereof;

a pair of fluid diffusion layers contiguously disposed to the anode and the cathode at both sides of the MEA; and a pair of separators for closely contacting the pair of fluid diffusion layers, forming flow field channels on sides thereof facing the fluid diffusion layers so as to form a reaction region, and forming manifold regions peripheral to the reaction region, characterized in that at least one of the pair of separators includes a lamellar structure graphite foil, and a hydrophobic layer is formed by impregnation on an interior side of the flow field channels of the at least one of the pair of separators.

The lamellar structure graphite foil may include a stainless steel layer therewithin. Preferably in this case, the stainless steel layer is exteriorly exposed, interposing the hydrophobic layer.

Preferably, the graphite foil is substantially free from thermosetting or thermoplastic resin.

A bulk density of the graphite foil preferably lies in the range of 1.5 g/cm$^3$ to 2.0 g/cm$^3$.

A thickness of the graphite foil preferably lies in the range of 0.5 mm to 3 mm.

A thickness of the hydrophobic layer preferably lies in the range of 30 μm to 100 μm.

It is preferable that a sealing member is unified to the separator along each circumference of the manifold and the reaction region.

DETAILED DESCRIPTION OF THE PREFERRED EMBODIMENTS

An embodiment of the present invention will hereinafter be described in detail with reference to the accompanying drawings.

In the description below, terms such as upper portion/lower portion and front side/rear side implying directions are used for convenience of explanation. However, such terms are only for convenience of description and better understanding, so it should not be understood that specific elements should be disposed at such directions according to the present invention.

Figure 1:
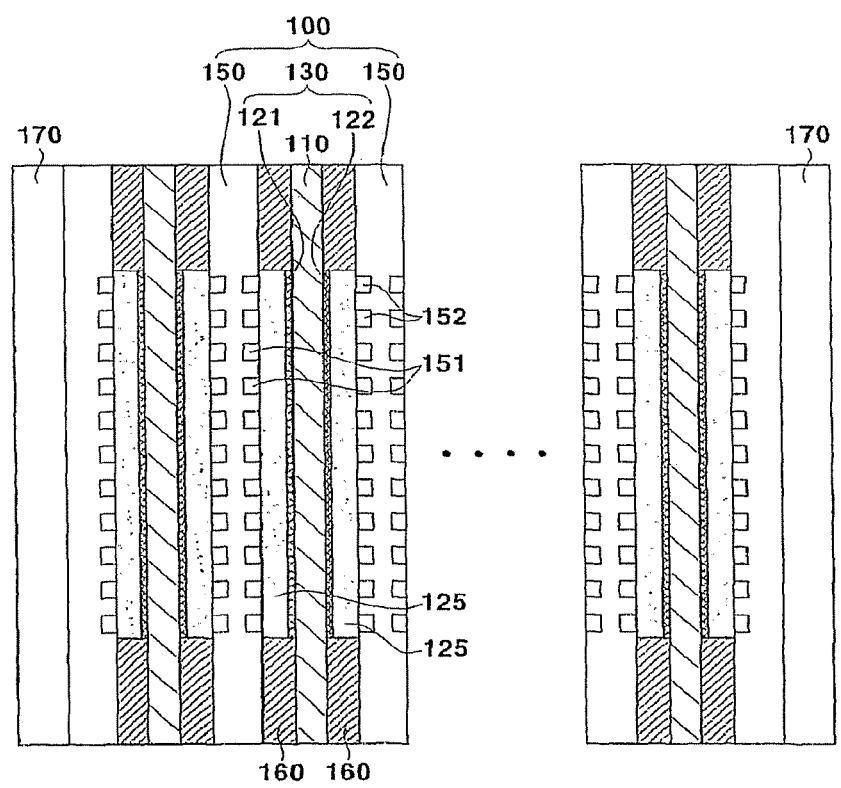
FIG. 1 is a schematic sectional view of an exemplary fuel cell stack.
Figure 2:
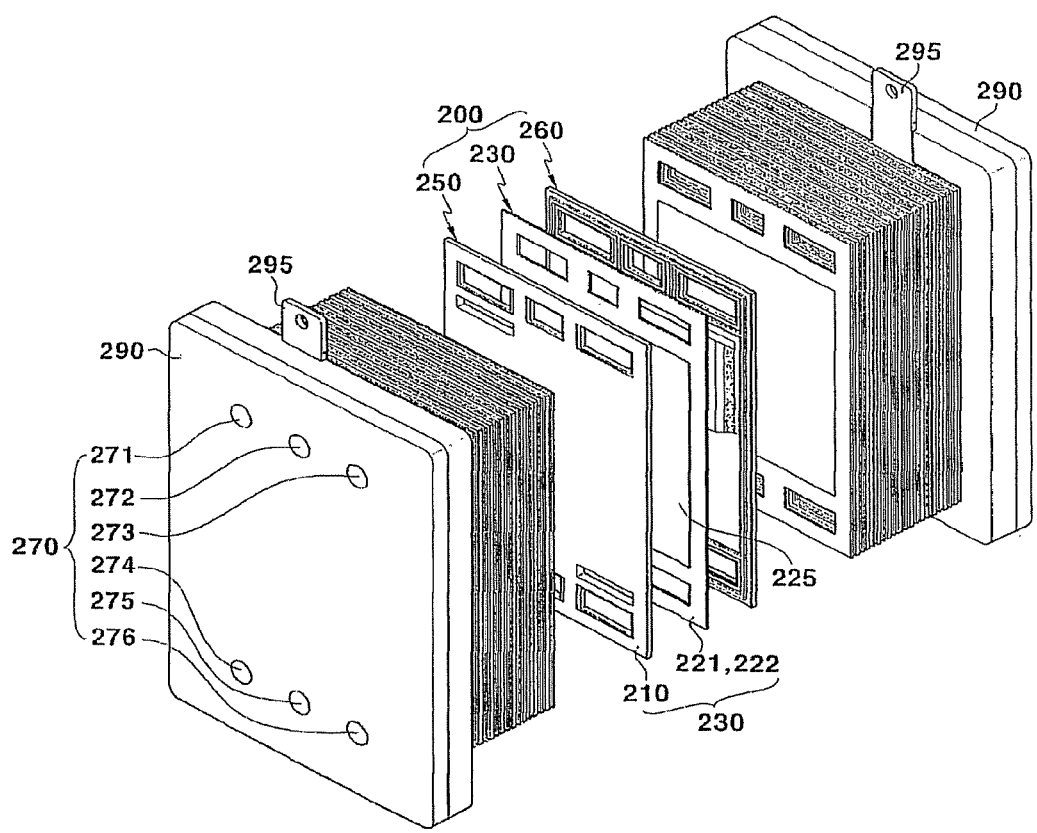
FIG. 2 is an exploded perspective view of a fuel cell stack according to an embodiment of the present invention.

FIG. 2 is an exploded perspective view of a fuel cell stack according to an embodiment of the present invention.

As shown in FIG. 2, a fuel cell stack according to an embodiment of the present invention includes a stack of a plurality of unit cells 200. The stack of the unit cells 200 are conjoined by end plates 290 disposed at ends thereof. The end plates 290 are formed with current collectors 295, and thereby supply electricity produced through the entire fuel cell stack.

At the end plate 290 applying a conjoining pressure to the fuel cell stack, a multiplicity of connection holes 270 are formed for supplying and exhausting reaction gas etc. to/from the fuel cell stack. The connection holes 270 include a hydrogen supply hole 271, a coolant supply hole 272, an air supply hole 273, an air exhaust hole 274, a coolant exhaust hole 275, and a hydrogen exhaust hole 276. Each of the connection holes 271-276 is connected to a corresponding manifold in the fuel cell stack 100.

For each unit cell 200, fluid diffusion layers 225 are attached to front and rear of an MEA 230, and separators 250 and 260 are disposed to front and rear of the MEA 230 and attached to the fluid diffusion layers 225. Hereinafter, the left side of FIG. 2 is referred to as frontward of the unit cells 200, and the right side of FIG. 2 is referred to as rearward of the unit cells 200.

The above-described fluid diffusion layer 225 is usually called a gas diffusion layer (GDL) in the art. However, the material diffused/distributed through the fluid diffusion layer 225 is not necessarily a gas, so the term fluid diffusion layer is hereinafter used instead of the usual term gas diffusion layer.

Figure 3:
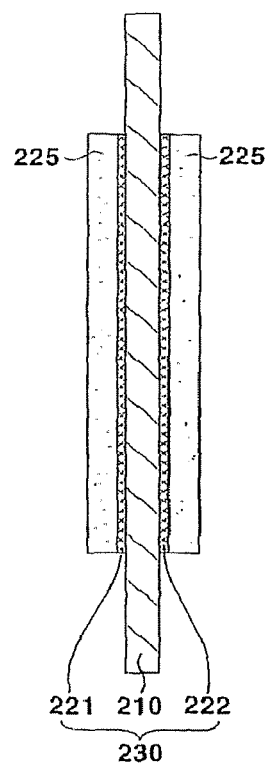
FIG. 3 a sectional view showing a detailed junction structure of an MEA and fluid diffusion layers in a unit cell of a fuel cell stack according to an embodiment of the present invention.

FIG. 3 is a sectional view showing a detailed junction structure of an MEA 230 and fluid diffusion layers 225 in a unit cell 200 of a fuel cell stack according to an embodiment of the present invention.

As shown in FIG. 3, according to an embodiment of the present invention, an anode 221 and a cathode 222 are respectively formed, by pressing, to front and rear sides of a polymer electrolyte membrane 210, and the fluid diffusion layer 225 is formed to each exterior of the anode 221 and the cathode 222

Referring back to FIG. 2, a cathode side separator 260 is in close contact with the cathode of the MEA 230 having the fluid diffusion layer 225, and an anode side separator 250 is in close contact with the anode.

In the following description of an embodiment of the present invention, the anode side separator 250 is described to be of a monopolar structure, and the cathode side separator 260 is described to be of a bipolar structure. However, the protection scope of the present invention should not be understood to be limited thereto, because the spirit of the present invention may be applied to various other schemes of disposing separators at the front and rear of the MEA 230.

The separators 250 and 260 are closely conjoined to exterior surfaces of the fluid diffusion layers 225, and have a plurality of flow field channels on their surface closely facing the fluid diffusion layers. The flow field channels of the separators 250 and 260 are used as passages of reaction gas between the fluid diffusion layers 225 and the separators 250 and 260.

The separators 250 and 260 distribute reaction gases through the fuel cell stack, separate a fuel gas and a reduction gas, and electrically connect adjacent unit cells by providing an electron passage between an anode and a cathode of adjacent unit cells. In addition, the separators have a heat exhaust structure for exhausting heat produced by the oxidation-reduction reaction of the fuel cell stack, and provide mechanical strength for supporting the stacked unit cells.

The separators 250 and 260 according to an embodiment of the present invention are hereinafter described in further detail.

Figure 4:
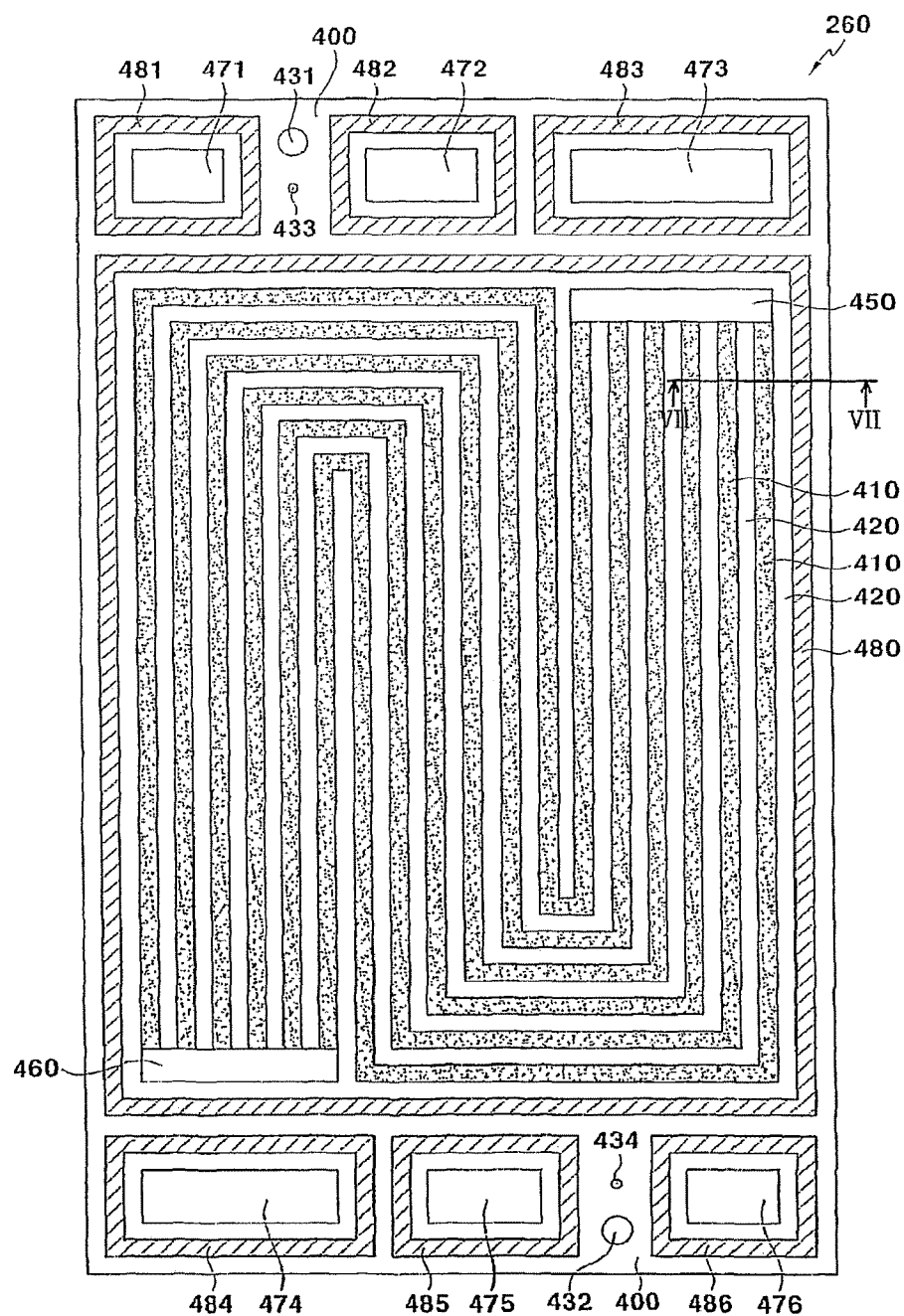
FIG. 4 shows a front side 400 (i.e., a side toward a cathode) of a cathode side separator 260 of a unit cell 200 of a fuel cell stack according to an embodiment of the present invention.

FIG. 4 shows a front side 400 (i.e., a side toward a cathode) of a cathode side separator 260 of a unit cell 200 of a fuel cell stack according to an embodiment of the present invention.

As shown in FIG. 4, at an upper portion of the cathode side separator 260, a hydrogen supply manifold 471, a coolant supply manifold 472, and an air supply manifold 473 are formed through the separator 260, respectively corresponding to the hydrogen supply hole 271, the coolant supply hole 272, and the air supply hole 273.

In addition, at a lower portion of the cathode side separator 260, an air exhaust manifold 474, a coolant exhaust manifold 475, and a hydrogen exhaust manifold 476 are formed through the separator 260, respectively corresponding to the air exhaust hole 274, the coolant exhaust hole 275, and the hydrogen exhaust hole 276.

For preventing leakage of reaction gas/coolant from the manifolds 471-476, manifold sealant grooves 481-486 for application of sealant are respectively formed around each of the manifolds 471-476.

At a fuel cell reaction region (i.e., a region contacting the fluid diffusion layer 225) in front of the cathode side separator 260, air flow-field channels 410 for supplying air to the MEA 230 are formed by ribs 420 defining the route. Such air flow-field channels 410 are formed as grooves of a predetermined depth.

FIG. 4 illustrates that the air flow-field channels 410 of the separator 260 according to an embodiment of the present invention are of a serpentine shape. However, this is only an exemplary shape of which the spirit of the present invention may be applied, and accordingly the protection scope of the present invention should not be understood to be limited thereto.

At entry ends of the air flow-field channels 410, an air supply hole 450 for supplying air to the air flow-field channels 410 is formed through the separator 260, and at exit ends of the air flow-field channels 410, air exhaust hole 460 for exhausting air from the air flow-field channels 410 is formed through the separator 260.

The air supplied to the air supply manifold 473 is supplied to the air supply hole 450 through air supply passages 550 (refer to FIG. 5) formed at the rear side of the separator 260. The air exhausting from the air exhaust hole 460 is exhausted to the air exhaust manifold 474 through air exhaust passages 560 (refer to FIG. 5) formed at the rear side of the separator 260.

Around the reaction region having the air flow-field channels 410, the air supply hole 450, and the air exhaust hole 460, a reaction region sealant groove 480 is formed for application of sealant for preventing air leakage from the reaction region.

The sealant grooves 480-486 are in the form of closed loops that respectively enclose the manifolds and the region closely contacting the fluid diffusion layer.

In an area between sealant grooves 480-486 on the separator 260, at least one pair of aligning holes are formed through the separator 260, for alignment of flow field channels on front and rear sides of the separator 260.

The at least one pair of aligning holes are formed as a plurality of aligning hole pairs (pairs of 431 and 432, and 433 and 434) having different sizes. By forming the aligning hole pairs with different sizes, larger diameter aligning holes 431 and 432 enables rough alignment (i.e., allowing easy alignment), and smaller diameter aligning holes 433 and 434 enable a precise alignment.

As an example, FIG. 4 illustrates that the pair of the larger diameter aligning holes 431 and 432 are formed at upper and lower portions of the separator, and the pair of the smaller diameter aligning holes 433 and 434 are formed interior to the larger diameter aligning holes 431 and 433.

Again as an example, FIG. 4 illustrates that the aligning holes 431 and 433 at the upper portion are formed between the sealant groove 481 of the hydrogen supply manifold 471 and the sealant groove 482 of the coolant supply manifold 472, and the aligning holes 432 and 434 at the lower portion are formed between the sealant groove 486 for the hydrogen exhaust manifold 476 and the sealant groove 485 for the coolant exhaust manifold 475.

Aligning of the flow field channels on the front and rear sides 400 and 500 of the bipolar separator 260 using the aligning holes 431, 432, 433, and 434 is described in further detail in the description regarding a manufacturing method of a separator according to an embodiment of the present invention.

Figure 5:
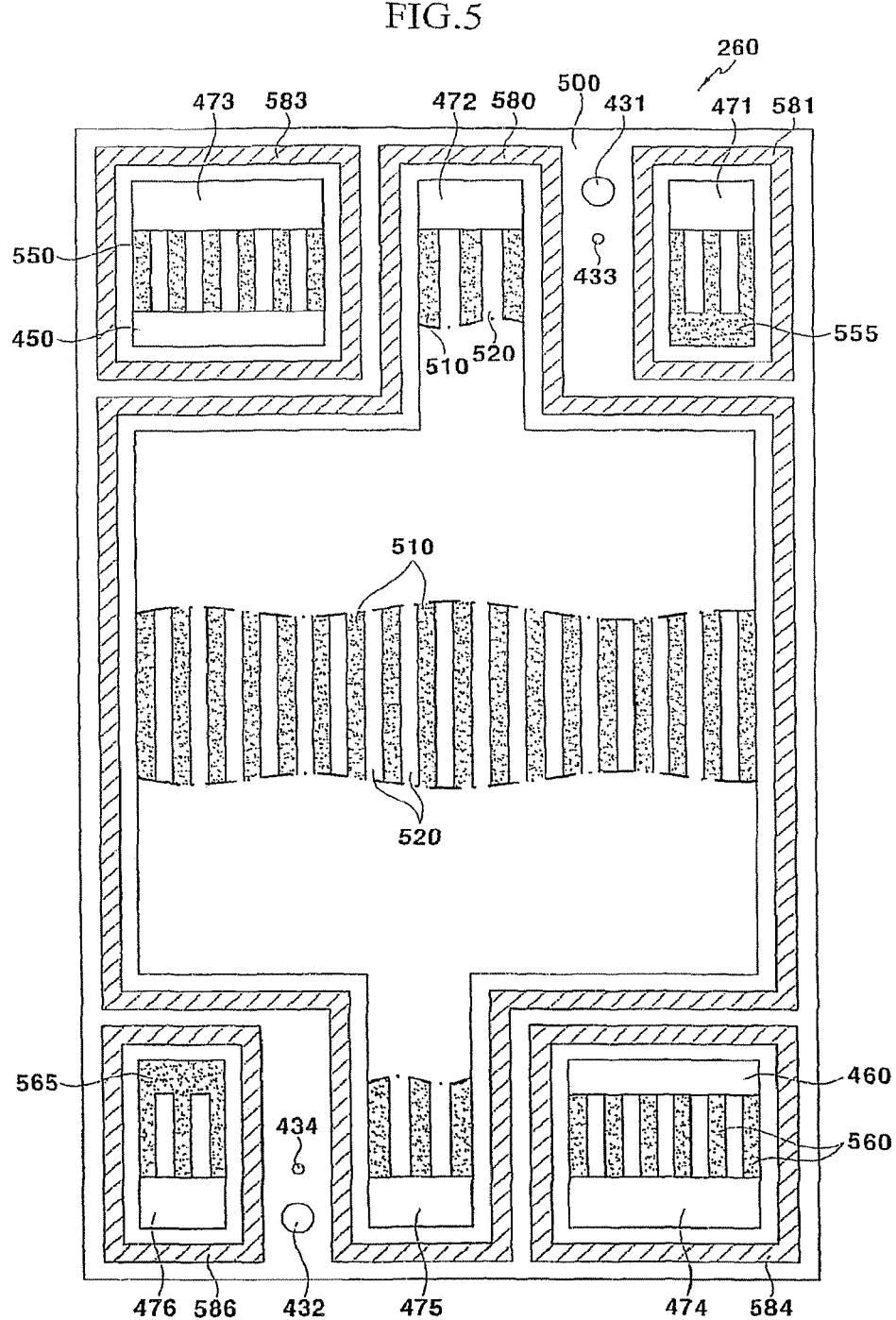
FIG. 5 shows a rear side 500 (i.e., a side opposite to a cathode) of a cathode side separator 260 of a unit cell 200 of a fuel cell stack according to an embodiment of the present invention.

FIG. 5 shows a rear side 500 (i.e., a side opposite to a cathode) of a cathode side separator 260 of a unit cell 200 of a fuel cell stack according to an embodiment of the present invention.

As shown in FIG. 5, the air supply manifold 473 and the air supply hole 450 are interconnected through the air supply passages 550, and the air exhaust manifold 474 and air exhaust hole 460 are interconnected through the air exhaust passages 560. The air supply passages 550 and the air exhaust passages 560 are formed on the rear side 500 of the separator 260 in the form of grooves.

In addition, hydrogen supply passages 555 are formed to be connected to the hydrogen supply manifold 471, and hydrogen exhaust passage 565 are formed to be connected to the hydrogen exhaust manifold 476. The hydrogen supply passages 555 and hydrogen exhaust passage 565 are formed on the rear side 500 of separator 260 in the form of grooves.

Sealant grooves 581, 583, 584, and 586 for application of sealant are respectively formed around each of the manifolds 471, 473, 474, and 476, in the form of closed loops that respectively enclose the manifolds and passages connected thereto.

At a central portion on the rear side 500 of the separator, coolant flow-field channels 510 for circulating the coolant supplied from the coolant supply manifold 472 are formed by ribs 520 defining the route. Such coolant flow-field channels 510 on the rear side 500 of the separator are formed to be aligned with the air flow-field channels 410 on the front side 400 of the separator.

The fuel cell coolant is supplied to the coolant flow-field channels 510 through the coolant supply manifold 472, is circulated on the rear side of the separator 260, and is then exhausted through the coolant exhaust manifold 475.

A sealant groove 580 for application of sealant for preventing leakage of coolant is formed enclosing the coolant supply manifold 472, the coolant flow-field channel 510, and the coolant exhaust manifold 475.

Figure 6:
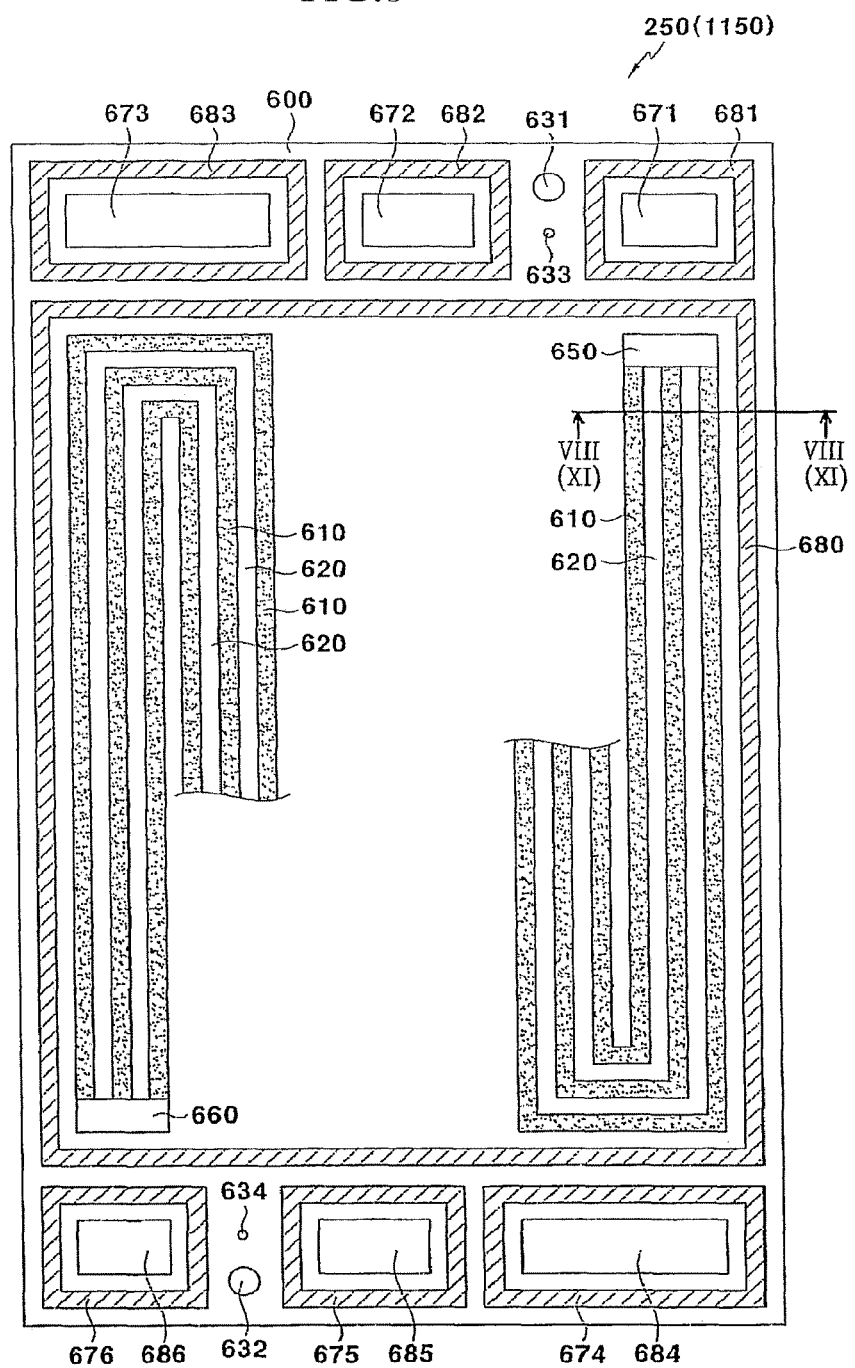
FIG. 6 shows a rear side 600 (i.e., a side toward an anode) of an anode side separator 250 of a unit cell 200 of a fuel cell stack according to an embodiment of the present invention.

FIG. 6 shows a rear side 600 (i.e., a side toward an anode) of an anode side separator 250 of a unit cell 200 of a fuel cell stack according to an embodiment of the present invention.

The rear side of the anode side separator 250 is structured similarly to the front side 400 of the cathode side separator 260.

That is, as shown in FIG. 6, at an upper portion of the separator 250, a hydrogen supply manifold 671, a coolant supply manifold 672, and an air supply manifold 673 are formed through the separator 250. In addition, at a lower portion of the separator 250, an air exhaust manifold 674, a coolant exhaust manifold 675, and a hydrogen exhaust manifold 676 are formed through the separator 250. In addition, manifold sealant grooves 681-686 for application of sealant are respectively formed around each of the manifolds 671-676.

At a fuel cell reaction region in rear of the anode side separator 250, hydrogen flow-field channels 610 for supplying hydrogen to the MEA 230 are formed by ribs 620 defining the route.

At entry ends of the hydrogen flow-field channels 610, a hydrogen supply hole 650 for supplying hydrogen to the hydrogen flow-field channels 610 is formed through the separator 250, and at exit ends of the hydrogen flow-field channels 610, a hydrogen exhaust hole 660 for exhausting hydrogen from the hydrogen flow-field channels 610 is formed through the separator 260.

The hydrogen supplied to the hydrogen supply manifold 671 is supplied to the hydrogen supply hole 650 through hydrogen supply passages 555 (refer to FIG. 5) formed at the rear side of the cathode side separator 260 of an adjacent unit cell. The hydrogen exhausting from the hydrogen exhaust hole 660 is exhausted to the hydrogen exhaust manifold 676 through hydrogen exhaust passages 565 (refer to FIG. 5) formed at the rear side of the cathode side separator 260 of an adjacent unit cell.

Around the reaction region having the hydrogen flow-field channels 610, the hydrogen supply hole 650, and the hydrogen exhaust hole 660, a reaction region sealant groove 680 is formed for application of sealant for preventing hydrogen leakage from the reaction region.

Aligning holes 631, 632, 633, and 634 are formed through the anode side separator 250 at the same positions and same sizes with the aligning holes 431, 432, 433, and 434 of the cathode side separator 260. Stacking of the unit cells 200 may be eased due to the aligning holes 431, 432, 631, and 632.

In the above description, exterior features of and reaction gas/coolant communication through the separators 250 and 260 according to an embodiment of the present invention were main topics.

Hereinafter, materials, interior structure, and manufacturing method of separators 250 and 260 are described in detail.

Figure 7:
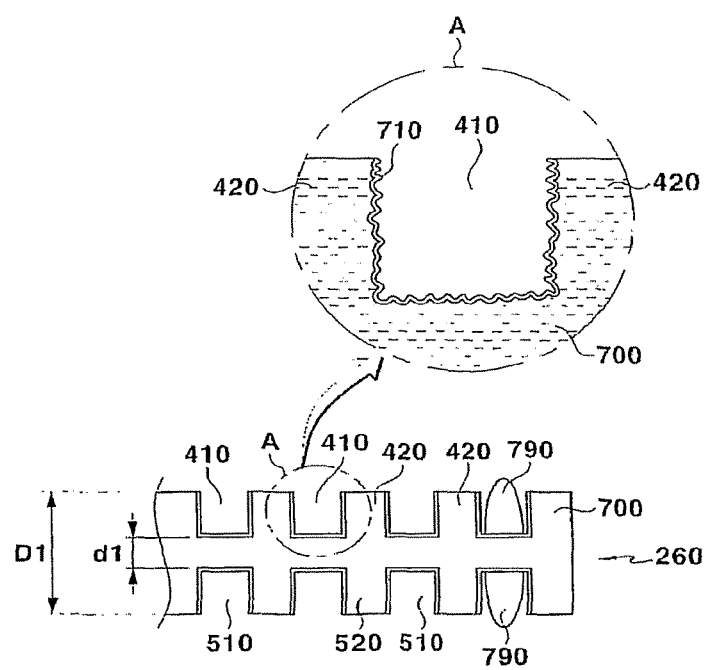
FIG. 7 is a sectional view of FIG. 4 along a line VII-VII.
Figure 8:
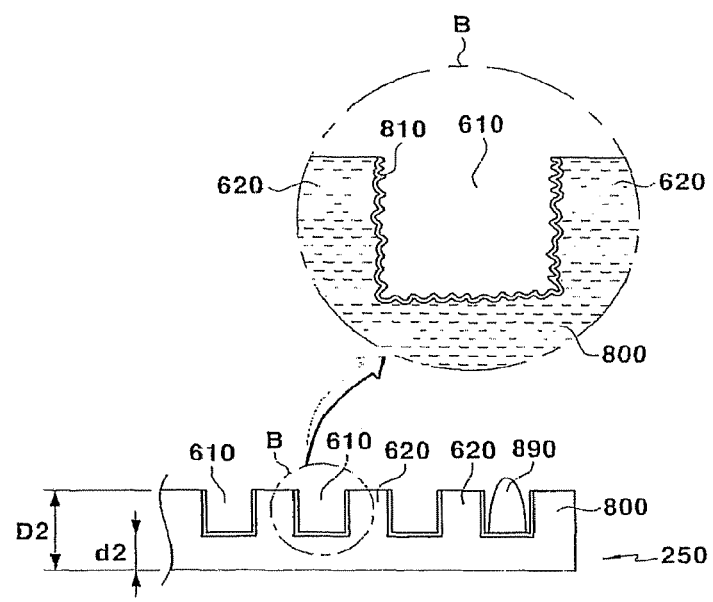
FIG. 8 is a sectional view of FIG. 6 along a line VIII-VIII.

FIG. 7 is a sectional view of FIG. 4 along a line VII-VII, and FIG. 8 is a sectional view of FIG. 6 along a line VIII-VIII.

According to an embodiment of the present invention, graphite foil 700 and 800 is used as a material for the separators 250 and 260.

Manufacturing of a graphite foil is usually accompanied by a pressing step, and a graphite foil pressed with a high pressure has an internal lamellar structure.

Therefore, according to an embodiment of the present invention, the material for the separators 250 and 260 may be called a lamellar structure graphite foil.

The enlarged portion A of FIG. 7 and portion B of FIG. 8 may be referred to for the lamellar structure of the graphite foils 700 and 800 used for materials of the separators 250 and 260 according to an embodiment of the present invention, For a usual graphite foil, heat conductivity thereof is more than 250 W/mK in the stacking direction of unit cells. Therefore, it may contribute to an enhancement of heat exhaust performance of a fuel cell stack and also to uniformity in temperature distribution of a fuel cell stack.

In a separator of a graphite/carbon composite material according to the prior art, a resin such as thermosetting resin or thermoplastic resin is included in the separator, for preventing leakage of reaction gas or for easier molding of graphite material.

However, according to the separators 250 and 260 according to an embodiment of the present invention, the graphite foil used for the separators is substantially free from such resin. Lamellar structure graphite foils are currently mass produced, and if the resin of the prior art does not need to be contained, mass productivity of the graphite foils further increases. Therefore, if such lamellar structure graphite foil is used for manufacturing a separator, it contributes to a reduction of production cost of a separator.

Furthermore, the separator of graphite material containing resin according to the prior art is rarely used for a fuel cell operating at a temperature higher than about 100° C. because heat deflection temperature of most of the resins is below about 100° C.

Therefore, in the case that a graphite foil free from the resin may be used for a separator, an operating temperature range of a fuel cell may be broadened, and durability of the fuel cell may be enhanced against the case that the fuel cell is overheated more than 100° C.

In fact, separators 250 and 260 may have high formability for, e.g., forming flow fields on the separators 250 and 260, without containing resin therein. Furthermore, leakage prevention of reaction gases and a hydrophobic effect may be preserved, while enhancing the durability. A method for manufacturing a stable and high-performance separator using a graphite foil without containing resin is described later.

A separator of a fuel cell should maintain uniform pressure without deformation during stacking of a fuel cell stack, and it should provide sufficient electric conductivity.

Therefore, it is preferable that the graphite foil used as a material for the separators 260 and 250 of an embodiment of the present invention shows a bulk density higher than 1.5 g/cm$^3$. As an experimental result, in the case that the bulk density of the graphite foil is lower than 1.5 g/cm$^3$, reaction gas leakage or a contact resistance increase has been found to possibly occur due to excessive deformation of the separator when stacked in the fuel cell stack.

In addition, an excessively high bulk density causes an increase of production cost of a graphite foil, i.e., production cost of a separator. Therefore, graphite foil used for separators 250 and 260 of an embodiment of the present invention may have a bulk density less than 2.0 g/cm$^3$.

In the case that a separator is excessively thin, performance and durability of a fuel cell stack may be deteriorated due to an increase of gas permeability of the separator.

Considering such a point, it is preferable that thicknesses D1 and D2 of graphite foils used for the separators 250 and 260 according to an embodiment of the present invention are greater than 0.5 mm.

A minimum depth for the flow field channels is usually about 0.2 mm. Therefore, in the case that the thickness of a graphite foil is less than 0.5 mm, the thickness d2 of the flow field channels becomes less than 0.3 mm. In this case, it has been found that gas permeability of the graphite foils 700 and 800 becomes excessively high.

Therefore, by forming the separator of graphite foil at a thickness of at least 0.5 mm, enhancement of durability and performance is expected, guaranteeing such minimum thickness.

However, if the separator becomes excessively thick, production cost increases without any increase in performance and durability. As an experimental result, it has been found that the thickness of the graphite foil used for the separator according to an embodiment of the present invention does not need to be more than 3 mm.

Since a normal operating temperature of a polymer electrolyte membrane fuel cell is less than 100° C. and about 80° C., efficient and steady exhaust of reaction products, i.e., heat and water, is very important.

For such purpose, hydrophobic layers 710 and 810 are formed by impregnation on interior surfaces of the flow field channels 410 and 610 of the separators 260 and 250 according to an embodiment of the present invention. The hydrophobic layers formed on the flow field channels 410 and 610 also contribute to efficient supplying of reaction gases to electrodes through the fluid diffusion layers 225.

As shown in FIGS. 7 and 8, the hydrophobic layers 710 and 810 are not formed on the surfaces of the ribs 420 and 620. Therefore, contact resistance between the fluid diffusion layers 225 and the separators 260 and 250 does not increase because of the hydrophobic layers 710 and 810.

For conventional hydrophobic treatment according to the prior art, a hydrophobic layer is simply coated on a surface of a workpiece. In this case, the coated hydrophobic layer may be easily scraped or removed.

However, according to hydrophobic layers 710 and 810 of an embodiment of the present invention, interior sides of the flow field channels 410 and 610 are firstly modified to a roughness of several decades of micrometers (μm), and then the hydrophobic layers 710 and 810 are formed by impregnation on the roughened surface. Therefore, since hydrophobic layers 710 and 810 are formed on the roughened surface, cohesion strength hydrophobic layers 710 and 810 to the interior surface of the flow field channels 410 and 610 is enhanced and thereby durability of the hydrophobic layers 710 and 810 is enhanced.

Thickness of the hydrophobic layers 710 and 810 formed by impregnation into the flow field channels preferably lies in a range of 30 μm to 100 μm. The thickness of the hydrophobic layers 710 and 810 is preferably above 30 μm to durably provide the hydrophobic effect of the hydrophobic layer 710 and 810, considering the reaction gases and the coolant flow under the conjoining force of the fuel cell stack. To the contrary, in the case that the hydrophobic layers 710 and 810 are thicker than 100 μm, the hydrophobic solution used for the hydrophobic layer is excessively impregnated into the flow field channels 410 and 610. In this case, dividing of lamellas may occur due to, e.g., bubbles formed at the lamellar structure graphite foil, when heat treatment for hydrophobic effect (for example, heat treatment at 330° C.).

As has already been described with reference to FIGS. 4 to 6, sealant grooves 481-486, 681-686, 480, and 680 are formed around the manifolds 471-476 and 671-676 and the area contacting the fluid diffusion layers.

As shown in FIGS. 7 and 8, sealing members 790 and 890 are applied to the sealant grooves of the separators 260 and 250, and become integral with the separators 260 and 250. FIGS. 7 and 8 illustrate that sealing members 790 and 890 are applied only to specific portions, however, the sealing member 790 and 890 are actually applied to each of the sealant grooves 480-486, 580-586, and 680-686 of the separators 260 and 250. A rubber liquid of, e.g., silicon series, fluorine series, and olefin series may be used as the sealing members 790 and 890.

Since the sealing member is applied to the separators 260 and 250 on the sealant groove and becomes integral therewith, the assembly process of a fuel cell stack may be simplified.

Hereinafter, an embodiment of the present invention is described in detail regarding a method for manufacturing a separator made of a lamellar structure graphite foil and having a hydrophobic layer formed by impregnation on its flow field channels.

Figure 9:
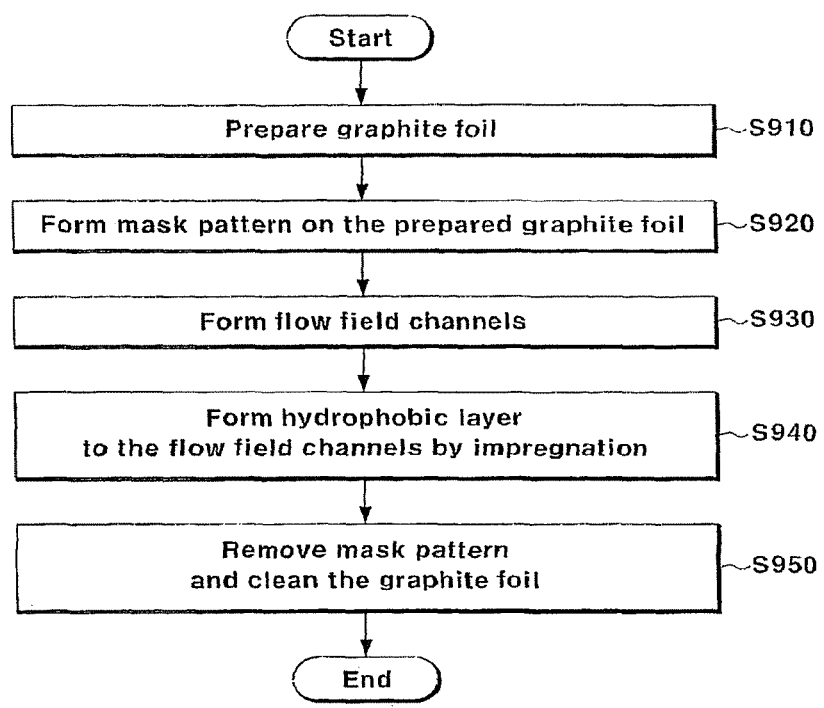
FIG. 9 is a flowchart showing a method for manufacturing a separator for a fuel cell according to an embodiment of the present invention.

FIG. 9 is a flowchart showing a method for manufacturing a separator for a fuel cell according to an embodiment of the present invention.

As shown in FIG. 9, according to a method for manufacturing a separator for a fuel cell according to an embodiment of the present invention, a graphite foil of a predetermined thickness and bulk density is firstly prepared at step S910.

Then at step S920, a mask pattern is formed on the prepared graphite foil corresponding to manifolds, sealant grooves, and flow field channels.

Then at step S930, the manifolds, the sealant grooves, and the flow field channels are formed on the graphite foil by selectively dry-etching the graphite foil formed with the mask pattern thereon.

Subsequently at step S940, a hydrophobic layer is formed on each interior side of the flow field channels by impregnation.

Finally at step S950, the mask pattern is removed from the graphite foil having the impregnated hydrophobic layer, and then the graphite foil is cleaned and heat-treated such that a separator is finalized.

A monopolar separator is finished by such a process.

For a bipolar separator, flow-field channels etc. (i.e., the manifolds, sealant grooves, and the flow field channels) are formed by executing the steps of S920 and S930 with respect to one side of the prepared graphite foil, and then the steps of S920 and S930 are also executed to the other side of the graphite foil such that the flow-field channels etc. are also formed to the other side.

Then, the graphite foil having the flow-field channels etc. on both sides thereof is processed according to the steps of S940 and S950, and accordingly the bipolar separator is completed.

A manufacturing method for a bipolar separator will be obviously understood from a description of a manufacturing method for a monopolar separator.

Hereinafter, the above-mentioned steps S910-S950 are described in further detail, with respect to an exemplary monopolar separator 250.

Firstly at step S910 of preparing the graphite foil, the prepared graphite foil has a thickness of 1.0 mm, an overall density of 1.78 g/cm3, and dimensions of 10 cm×15 cm. Moisture is removed from the prepared graphite foil by drying the foil in a dryer for 5 minutes at 100° C. The aligning holes 631, 632, 633, and 634 are formed at the prepared graphite foil. In this stage, only the diameters of the aligning holes 631, 632, 633, and 634 and the distance therebetween need be paid attention to in order to be formed in accordance with a predetermined specification, since the flow-fields channels etc. are not yet formed thereon.

The step S920 of forming the mask pattern may be further embodied in various ways. For example, a mask of a rubber or stainless steel material with a pattern corresponding to the flow field channels etc. may be attached to the graphite foil.

For another example, a dry film may be used.

In the case that a dry film (for example, BF410) is used, a dry film (e.g., BF410) of a thickness of 100 μm is coated on the graphite foil using a laminator apparatus. For the laminating process, it is preferable that the upper roller temperature is about 70° C., the lower roller temperature is about 65° C., and the rolling speed is about 60 mm/sec.

A film mask formed with a pattern for flow-field channels etc. is laid in contact with the graphite foil, and then the graphite foil with the film mask is exposed at an exposure machine for about 18-23 seconds with an energy density of about 20 mW/cm2.

In the case of a dry film, it may bulge when it is dipped in a liquid developer. Therefore, in order for develop a graphite foil coated with a dry film, it is preferable that a spray nozzle moves while spraying a liquid developer (e.g., 1~2% solution of Na2CO3) in a spray-type developing machine.

The developing conditions of the spray-type developing machine is preferably set to be the temperature of the liquid developer being about 25° C., the spray pressure being about 2.7 Kg/cm2, and the nozzle moving speed being about 80 mm/sec. When developed as such, it is preferably baked in an oven for about 5 minutes at about 100° C.

The step S920 of forming a mask pattern includes a step of attaching the mask on the graphite foil. For such a purpose, the aligning holes 631, 632, 633, and 634 and aligning bars are used. Attaching the mask on the graphite foil using the aligning holes 631, 632, 633, and 634 is hereinafter described in further detail.

Figure 10:
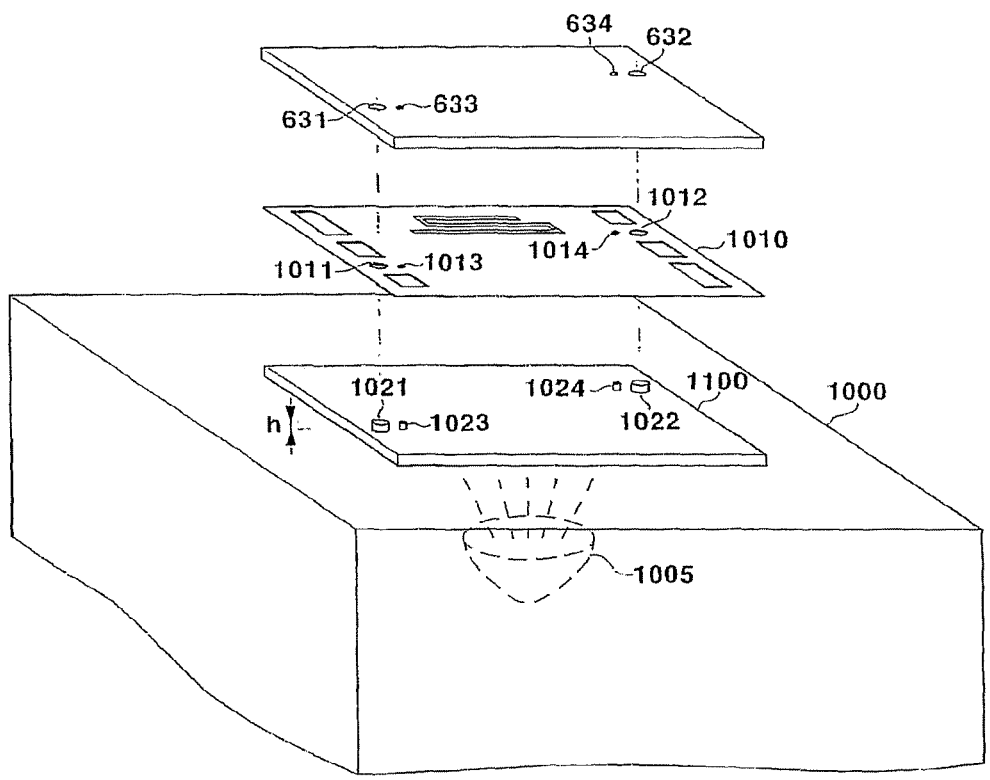
FIG. 10 is a drawing for illustrating a process for attaching a mask to a graphite foil in a method for manufacturing a separator according to an embodiment of the present invention.

As shown in FIG. 10, a pair of larger diameter aligning bars 1021 and 1022 and a pair of smaller diameter aligning bars 1023 and 1024 are formed protruding on a working plate 1100 on an exposure machine 1000. The working plate 1100 is formed as a transparent plate such that an exposure light generated at a light source 1005 of the exposure machine 1000 may penetrate therethrough.

A prepared mask 1010 is formed with aligning holes 1011, 1012, 1013, and 1014 at positions corresponding to the aligning bars 1021, 1022, 1023, and 1024. In addition, at the step S910 of preparing the graphite foil, aligning holes 631, 632, 633, and 634 are formed at the graphite foil at positions corresponding to the aligning bars 1021, 1022, 1023, and 1024.

Since a thickness of the mask 1010 is usually less than 0.2 mm, and it suffices that a protruding height h of the aligning bars 1021, 1022, 1023, and 1024 from the working plate 1100 is 0.2 mm. The larger diameter aligning bars 1021 and 1022 protrude slightly more than the smaller diameter aligning bars 1023 and 1024. Therefore, a separator may be precisely aligned in the correct position using the smaller diameter aligning bars 1023 and 1024 after it is positioned in a rough alignment position using the larger diameter aligning bars 1021 and 1022.

The mask 1010 is laid on the working plate 1100 such that the protruded aligning bars 1021, 1022, 1023, and 1024 may be inserted into the aligning holes 1011, 1012, 1013, and 1014. In this case, the aligning bars 1021, 1022, 1023, and 1024 fully penetrate the mask 1010 and protrude therefrom, since the protruding height h of the aligning bars 1021, 1022, 1023, and 1024 is greater than the thickness of the mask 1010.

Therefore, front and rear sides of the separator may be precisely aligned by simply disposing the prepared graphite foil such that the aligning holes 631, 632, 633, and 634 are inserted by aligning bars 1021, 1022, 1023, and 1024. By attaching masks on the graphite foil according to such an aligning process, front and rear sides of the separator are precisely aligned.

At the step S930 of forming the flow field channels, the graphite foil processed with the mask pattern process is dry-etched using, e.g., a sand blast apparatus, such that the depth of the flow field channels may become about 500 μm.

The sand blast condition is preferably set to be the separator moving speed being about 40 mm/minute, the nozzle moving speed being about 20 m/minute, the spraying pressure of the nozzle being about 3.0 kg/cm2, and the distance between the separator and the nozzle being about 60 mm. For example, SiC may be used as an abrasive such that surface roughness on the bottom of the flow field channels may become several decades of micrometers.

An ultrasonic etching process, that is, an etching process using an abrasive, may be performed instead of or together with the sand blast process.

At the step S950 of forming the hydrophobic layer by impregnation, the graphite foil having the flow-field channels and having the mask pattern attached thereon is dried in a range of 50° C. to 90° C. after dipping it in a hydrophobic solution (e.g., a 20% PTFE (polytetrafluoroethylene) solution) for 2 to 4 seconds, or processing by spray coating.

At the step S950 of finishing the separator, the mask pattern is removed in acetone using an ultrasonic cleaner such that the dry film attached to the graphite foil is removed, and then the graphite foil is cleaned and heat-treated to finalize the separator. The process of cleaning and heat-treating the graphite foil is obvious to a person of ordinary skill in the art. As for a mask of a rubber or a stainless steel material, it may be removed by simply dividing it.

In the above description of an embodiment of the present invention, a separator is described to use a graphite foil having a uniform structure. However, the protection scope of the present invention should not be understood to be limited thereto, since variations of embodiments may be possible, such as the case that a stainless steel layer is inserted inside the graphite foil used for the separator.

Hereinafter, a second embodiment of the present invention related to the case that the graphite foil used for the separator includes a stainless steel layer therein is described with reference to FIG. 11.

Figure 11:
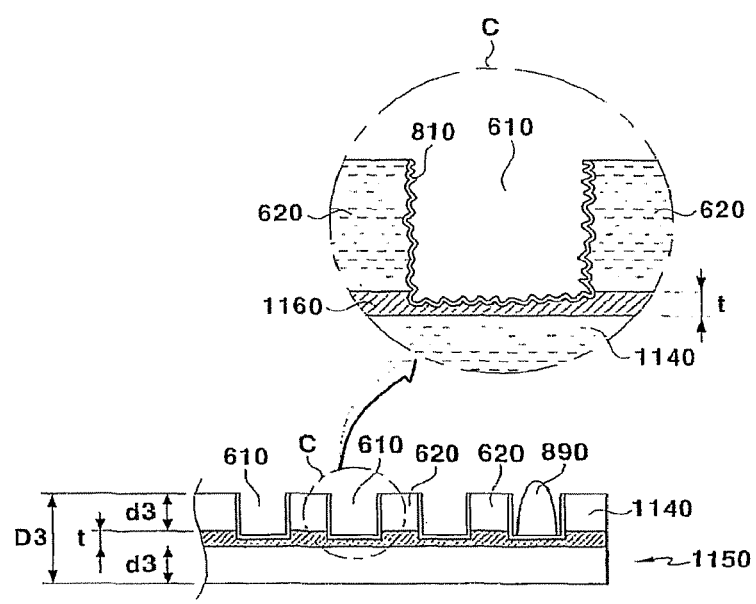
FIG. 11 is a sectional view of FIG. 6 along a line XI-XI according to a second embodiment of the present invention.

FIG. 11 is a sectional view of FIG. 6 along a line XI-XI according to a second embodiment of the present invention.

As shown in FIG. 11, a lamellar structure graphite foil 1140 used for a separator 1150 according to a second embodiment of the present invention includes a stainless steel layer 1160 therein.

Such graphite foil 1140 including the stainless steel layer 1160 may be easily manufactured e.g., by pressing graphite layers of predetermined thickness to front and rear of the stainless steel layer 1160.

The stainless steel layer 1160 may be of, e.g., SUS304 or SUS316, and its thickness t is preferably 0.1 mm to 0.3 mm. The thickness d3 of the graphite layers formed at front and rear sides of the stainless steel layer 1160 is preferably more than 0.2 mm considering the depth of flow-field channels 610, and is preferably less than 3 mm considering the production cost.

That is, the separator 1150 according to such a second embodiment of the present invention uses the graphite foil 1140 formed with, e.g., the stainless layer 1160 of 0.1 mm thickness at its center and graphite layers of 0.2 mm thickness at each of front and rear sides of the stainless layer 1160 (therefore, total thickness D3 of the graphite foil becomes 0.5 mm). The flow-field channels 610 are formed by dry-etching one side (e.g., upper side in FIG. 11) of the graphite foil 1140.

A method for manufacturing the separator 1150 using the graphite foil 1140 including the stainless steel layer 1160 therein is the same as a method for manufacturing the separators 250 and 260 according to the first embodiment of the present invention that has been described with reference to FIG. 10.

In the process of dry-etching for forming the flow-field channels 610, the graphite layer is etched such that the stainless steel layer 1160 is exposed. As for the process of dry-etching (e.g., the above-described sand blasting etching process), the stainless steel layer 1160 has a substantially smaller etch rate than the graphite layers formed to front and rear of the stainless steel layer 1160. Therefore, such stainless steel layer 1160 functions as an etch stop in the process of etching.

According to such a feature, the manufacturing process of a separator becomes easier, and a manufacturing device of lower precision may be used to produce a separator with equally high performance and precision.

Although rigidity of the stainless steel layer 1160 is higher than that of the graphite layer, the abrasive used in the etching process may easily form a roughness thereon, e.g., to the degree of several decades of micrometers described in connection with the first embodiment.

In addition, in the process of forming the hydrophobic layer (refer to the step S940 in FIG. 9), the hydrophobic layer 810 is formed while the stainless steel layer 1160 is exposed in the flow-field channels 610. Therefore, as for a finished separator 1150, the stainless steel layer 1160 becomes exteriorly exposed interposing the hydrophobic layer 810, since the hydrophobic layer 810 is formed while the stainless steel layer 1160 is exposed in the flow-field channels 610.

In the above description, the present invention has been exemplarily described in connection with a polymer electrolyte fuel cell. However, the protection scope of the present invention should not be understood to be limited thereto. To the contrary, the spirit of the present invention may be applied to an arbitrary fuel cell of which a normal operating temperature lies in a range below a heat deflection temperature of the graphite foil (e.g., below 250° C.). As an example, the spirit of the present invention may also be applied to a DMFC (direct methanol fuel cell).

Therefore, in the above description and also in the appended claims, the terms related to a polymer electrolyte fuel cell should not be understood to strictly refer to the specific element of the polymer electrolyte fuel cell.

For example, the term fuel gas should be understood in a collective meaning that covers methanol fuel supplied in the form of liquid as well as hydrogen in the form of gas. In addition, as for a fuel cell other than a polymer electrolyte fuel cell, the term MEA should be understood to be referring to a corresponding element of the fuel cell.

As described above, according to an embodiment of the present invention, lamellar structure graphite foil is used as a material for a separator for a fuel cell, and hydrophobic layer is formed by impregnation on an interior wall of flow field channels of the separator.

Therefore, water produced at cathodes may be efficiently exhausted, and thereby performance of the fuel cell may be enhanced, by, e.g., accelerating diffusion of reaction gases to catalyst layers. Accordingly, power density per unit volume of a fuel cell stack may be enhanced.

In addition, since the hydrophobic layer is formed by impregnation on an interior wall of flow-field channels of a separator that has been formed by dry-etching, durability of the hydrophobic layer is enhanced, and consequently, durability and reliability of a fuel cell is enhanced.

Furthermore, since an interior of the graphite foil is substantially free from resins such as thermosetting or thermoplastic resin and a hydrophobic layer is prevented from forming on the separator surface contacting an MEA by a mask pattern, additional processes for reducing contact resistance between cells are not required.

Furthermore, since such graphite foil exhibits high heat conductivity, the cooling effect of a fuel cell stack is enhanced and temperature distribution of a fuel cell stack becomes uniform.

Furthermore, since the lamellar structure graphite foil used as a material of a separator may be mass-produced, production cost of a separator and accordingly a fuel cell may be reduced.

Furthermore, since the manufacturing process of a separator may be simplified and be more adaptive to mass-production, the production cost of a separator and accordingly a fuel cell may be reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims that follow, unless explicitly described to the contrary, the word "comprise" or variations such as "comprises" or "comprising" will be understood to imply the inclusion of stated elements but not the exclusion of any other elements.

What is claimed is:

1. A method for manufacturing a fuel cell having a separator for the fuel cell that is capable of closely contacting either an anode or a cathode of a membrane electrode assembly (MEA) of the fuel cell and interposing a fluid diffusion layer, the separator having a flow field channel for allowing a fluid to flow between the separator and the fluid diffusion layer, the method comprising:
   preparing a graphite foil of a predetermined size;
   forming a mask pattern on the graphite foil corresponding to the flow field channel;
   forming the flow field channel on the graphite foil by etching the graphite foil formed with the mask pattern thereon;
   forming a hydrophobic layer on an interior side of the flow field channel by impregnation; and
   removing the mask pattern from the graphite foil,
   wherein the flow field channel is defined by ribs and is formed as a groove,
   wherein the hydrophobic layer is only formed on an interior side of the groove,
   wherein the graphite foil comprises a stainless steel layer therewithin, and wherein the stainless steel layer has a portion that is directly contacting the hydrophobic layer.

2. The method as claimed in claim 1, wherein the forming of the mask pattern on the graphite foil comprises:
   coating the graphite foil with a dry film resist;
   exposing the coated graphite foil; and
   developing the dry film resist on the graphite foil by moving a spray nozzle of a spray-type developing apparatus thereover.

3. The method as claimed in claim 2, wherein the forming of the hydrophobic layer on the interior side of the flow field channel by impregnation comprises:
   forming the hydrophobic layer on the graphite foil attached with the mask pattern and formed with the flow field channel; and
   drying the graphite foil formed with the hydrophobic layer, in a temperature range of 50° C.–90° C.

4. The method as claimed in claim 3, wherein, in the forming of the hydrophobic layer on the graphite foil, a hydrophobic solution is spray coated on a surface of the graphite foil, or the graphite foil is dipped in the hydrophobic solution.

5. The method as claimed in claim 1, wherein the forming of the mask pattern on the graphite foil comprises attaching a mask on the graphite foil, the mask being provided with a pattern corresponding to the flow field channel and being made of rubber or stainless steel.

6. The method as claimed in claim 5, wherein the forming of the hydrophobic layer on the interior side of the flow field channel by impregnation comprises:
   forming the hydrophobic layer on the graphite foil attached with the mask pattern and formed with the flow field channel; and
   drying the graphite foil formed with the hydrophobic layer, in a temperature range of 50° C.–90° C.

7. The method as claimed in claim 6, wherein, in the forming of the hydrophobic layer on the graphite foil, a hydrophobic solution is spray coated on a surface of the graphite foil, or the graphite foil is dipped in the hydrophobic solution.

8. The method as claimed in claim 1, wherein the forming of the flow field channel on the graphite foil comprises at least one of sandblasting and ultrasonic etching.

9. The method as claimed in claim 8, wherein the forming of the hydrophobic layer on the interior side of the flow field channel by impregnation comprises:
   forming the hydrophobic layer on the graphite foil attached with the mask pattern and formed with the flow field channel; and
   drying the graphite foil formed with the hydrophobic layer, in a temperature range of 50° C.–90° C.

10. The method as claimed in claim 9, wherein, in the forming of the hydrophobic layer on the graphite foil, a hydrophobic solution is spray coated on a surface of the graphite foil, or the graphite foil is dipped in the hydrophobic solution.

11. The method as claimed in one of claim 1, wherein the forming of the hydrophobic layer on the interior side of the flow field channel by impregnation comprises:
   forming the hydrophobic layer on the graphite foil attached with the mask pattern and formed with the flow field channel; and
   drying the graphite foil formed with the hydrophobic layer, in a temperature range of 50° C.–90° C.

12. The method as claimed in claim 11, wherein, in the forming of the hydrophobic layer on the graphite foil, a hydrophobic solution is spray coated on a surface of the graphite foil, or the graphite foil is dipped in the hydrophobic solution.

13. The method as claimed in claim 1, wherein:
   the flow field channel is formed on each of front and rear sides of the separator;
   the mask pattern comprises a front mask pattern and a rear mask pattern;
   at least one pair of aligning holes are formed at each of the front and rear mask patterns;
   at least one aligning hole is formed through the graphite foil corresponding to the at least one pair of aligning holes of the mask patterns; and
   the at least one pair of aligning holes of the mask patterns and the at least one aligning holes of the graphite foil are aligned by using at least one pair of aligning bars corresponding thereto.

14. The method as claimed in claim 13, wherein the at least one pair of aligning holes and the at least one pair of aligning bars respectively comprise a plurality of pairs thereof, corresponding to different sizes.

* * * * *